Nov. 1, 1949.  F. ARBOGAST  2,486,626
ARTIFICIAL FISH BAIT
Filed June 2, 1947
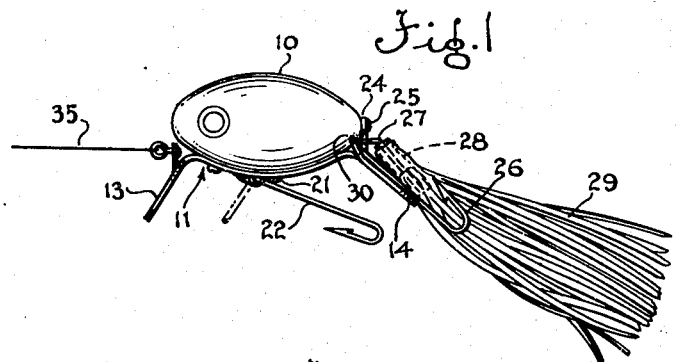
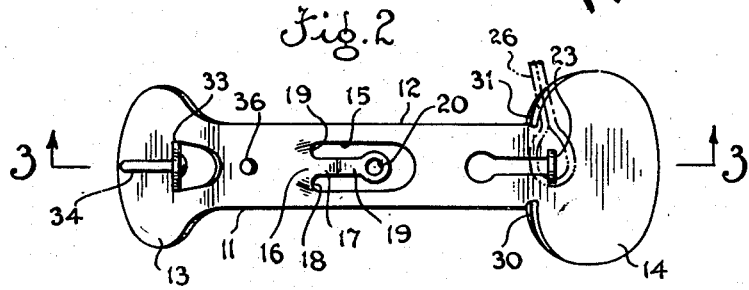
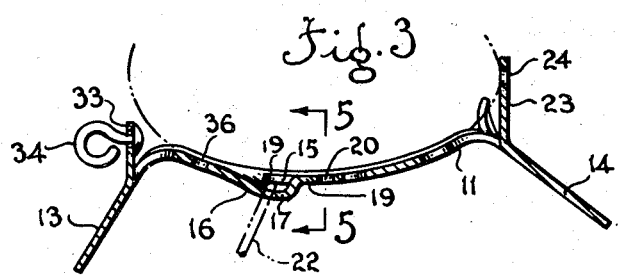
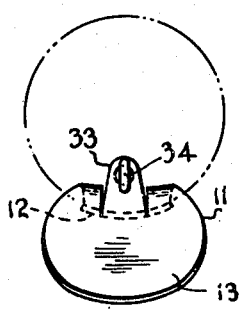 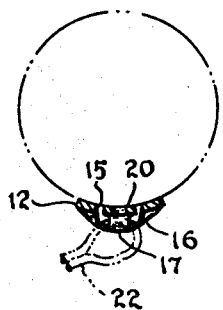 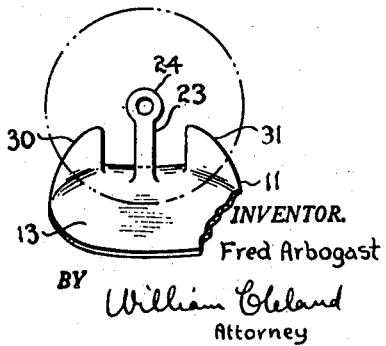
INVENTOR.
Fred Arbogast
BY William Cleland
Attorney Patented Nov. 1, 1949

2,486,626

UNITED STATES PATENT OFFICE 2,486,626

ARTIFICIAL FISH BAIT

Fred Arbogast, Akron, Ohio; Nellie E. Arbogast executrix of said Fred Arbogast, deceased Application June 2, 1947, Serial No. 751,886

4 Claims. (Cl. 43—42.47)

This invention relates to an artificial fish bait.

One object of the invention is to provide an artificial fish bait, including a body and a one-piece attachment therefor having combined features of producing a unique bait action in the water and providing integral elements for ready attachment of a fish-line, fish-hooks, or other elements, and by which is eliminated the usual necessity of providing a plurality of separate attachments requiring separate manufacture and assembly, the improved construction thereby resulting in a material reduction in manufacturing costs of the bait.

Another object of the invention is to provide a combination attaching member of the character described which lends itself to large scale production of uniformly accurately assembled articles having correspondingly uniform bait action.

These and other objects of the invention will be manifest from the following brief description and the accompanying drawings.

Of the accompanying drawings:

Figure 1 is a side elevation of an artificial bait having incorporated thereon an improved combination attachment embodying the features of the invention.

Figure 2 is a top plan view, on an enlarged scale, of the attachment removed from the bait body.

Figure 3 is a vertical cross-section taken substantially on the line 3—3 of Figure 2.

Figure 4 is an end view of the attachment, as viewed from the left of Figure 3.

Figure 5 is a vertical cross-section taken on the line 5—5 of Figure 3.

Figure 6 is an end view as viewed from the right of Figure 3.

Referring particularly to Figure 1, there is shown an artificial bait wherein a generally ovate body 10 has secured to the convex underside thereof a combination action-producing and attaching device 11, embodying the features of the invention.

Referring generally to Figures 1 to 6, the attaching member 11 is formed from a one-piece blank, as by known blanking and forming methods, to have a relatively narrow elongated strip 12, terminating at the front and rear ends thereof in relatively large, disk-like action-producing plates 13 and 14, respectively. The front plate 13 inclines forwardly and downwardly at an angle to the horizontal axis of the bait and the rear plate is oppositely inclined downwardly and rearwardly at an angle to said axis, to produce requisite action to the bait as it is drawn through the water.

Centrally of strip 12, intermediate the plates 13 and 14, it is provided with a cut-out or opening 15 and formed with an outward dome-shaped projection 16 defining an integral arched tang 17, overlying said opening, and rearwardly presented shoulders 18 and 19 at opposite sides of the tang for purposes to be described later. The free end of tang 17 extends in the plane of the strip and terminates in an eyelet 20, through the aperture of which a screw 21 may be threaded into body 10 (see Figure 1), after the reception of the tang through the usual eye of a double hook 22, for example.

At the juncture of strip 12 and plate 14 an upstanding tang 23 is pressed out of the blank, the tang terminating in an eyelet 24 through which a fastening screw 25 may extend into the rear end of body 10. The tang is adapted to be received through the eye of a fish-hook 26 and/or the eye of streamer attaching member 27, prior to placing the screw 25. Member 27 includes an enlarged retaining head over which an elastic tubular part 28 of a streamer 29 is expanded. Portions of plate 14 adjacent opposite edges of strip 12 may be stamped and formed to provide upstanding ears 30 and 31 at opposite sides of tang 23, these ears being engageable by the hook 26 or member 27 for limiting forward swinging movement of the same (see chain-dotted lines in Figure 2).

At the juncture of forward plate 13 and strip 12, an upstanding lug 33 is formed out of the one-piece blank, this lug being apertured for attachment of a swivel eyelet 34, to which in turn may be attached a fish-line 35 (Figure 1).

For reception of an additional fastening screw 37 into body 10, an aperture 36 is provided in strip 12, slightly rearwardly of lug 33.

In the use of the improved bait, with or without the streamer 29 attached, it will have a lively bait action attractive to fish life when drawn through the water. The rear plate 14 and the ears 30 and 31 will limit all forward swinging movement of rear hook 26 which would cause it to snag on the forward hook 22, or which would allow it to contact body 10 and wear away the decorative surface coating thereof. Rearwardly upward swinging movement of hook 22 is limited by engagement with the head of screw 21; lateral swinging movement of the hook is limited by engagement with the side edge portions of the strip 12 defined by opening 15 therein; and forward swinging movement is limited by engagement of the hook with the shoulders 18 and 19 at opposite sides of the hook-receiving tang 17. Thus, the surface coating of body 10 is also effectively protected against wear by contact of the hook 22 therewith.

It will be readily seen that the attaching members 11 may be made by mass production methods to have the desirable qualities of uniformity with respect to bait action. Production costs will be materially reduced, due to the fact that only one attaching member is applied to the bait body 10, instead of a plurality of separate action-producing and hook-retaining attaching members.

Modifications of the invention may be resorted to without departing from the spirit thereof or the scope of the appended claims.

What is claimed is:

1. An attachment for a fishing lure comprising a plate having a narrow intermediate portion and enlarged end portions, the end portions being angularly related to the intermediate portion and extending outwardly therefrom at the same side of the intermediate portion, each of the end portions being substantially flat, each of the end portions having extending therefrom at angles thereto a tang integral with the end portions and constituting a struck-up part adjacent the intermediate portion, each said tang having an opening therein, the intermediate portion having an opening and an off-set portion, said off-set portion including a projection with an opening therein, said opening in the projection being adapted to receive means for securing the attachment to a fishing lure, and said projection being adapted to receive an eye of a fishing hook, the opening in the projection permitting the passage of the securing means to be secured to the lure and also to prevent removal of the eye of the hook from the projection.

2. An attachment as set forth in claim 1, wherein one of the end portions has upstanding ears constituting stops, whereby the shank of a fishing implement supported on the tang adjacent said ears will be prevented from contacting a fishing lure secured to the attachment.

3. An attachment for a fishing lure comprising a plate having an elongated intermediate portion and end portions, the end portions being angularly related to the intermediate portion and extending outwardly therefrom at the same side of the intermediate portion, each of the end portions being substantially flat, each of the end portions having extending therefrom at angles thereto a tang integral with the end portions and constituting a struck-up part adjacent the intermediate portion, the intermediate portion having an off-set portion, said off-set portion including a projection having an opening adapted to receive means for securing the attachment to a fishing lure, said projection being adapted to receive an eye of a fishing hook and said means being adapted to prevent removal of the eye of the hook from the projection.

4. An attachment as set forth in claim 3, wherein one of the end portions has upstanding ears constituting stops, whereby the shank of a fishing implement supported on the tang adjacent said ears will be prevented from contacting a fishing lure secured to the attachment.

FRED ARBOGAST.

REFERENCES CITED

The following references are of record in the file of this patent:

UNITED STATES PATENTS

| Number | Name | Date |
|---|---|---|
| 1,345,600 | Keeling | July 6, 1920 |
| 2,001,652 | Bird | May 14, 1935 |
| 2,261,867 | Arbogast | Nov. 4, 1941 |
| 2,429,339 | Arbogast | Oct. 21, 1947 |
| 2,435,932 | Smith | Feb. 10, 1948 |